(12) United States Patent
Naganawa et al.

(10) Patent No.: US 9,108,124 B2
(45) Date of Patent: Aug. 18, 2015

(54) CONTINUOUS COLLECTION METHOD OF PARTICLE COMPONENT IN AQUEOUS SOLUTION AND APPARATUS THEREFOR

(75) Inventors: Hirochika Naganawa, Ibaraki (JP); Nobuyuki Yanase, Ibaraki (JP); Tetsushi Nagano, Ibaraki (JP)

(73) Assignee: Japan Atomic Energy Agency, Ibaraki (JP)

( * ) Notice: Subject to any disclaimer, the term of this patent is extended or adjusted under 35 U.S.C. 154(b) by 254 days.

(21) Appl. No.: 13/527,013

(22) Filed: Jun. 19, 2012

(65) Prior Publication Data

US 2012/0255905 A1    Oct. 11, 2012

Related U.S. Application Data

(62) Division of application No. 12/570,470, filed on Sep. 30, 2009.

(30) Foreign Application Priority Data

Sep. 30, 2008   (JP) ................................. 2008-253778
Sep. 30, 2008   (JP) ................................. 2008-253779

(51) Int. Cl.
*B01D 11/04*       (2006.01)
*C02F 1/26*        (2006.01)
(Continued)

(52) U.S. Cl.
CPC ........ *B01D 11/0434* (2013.01); *B01D 11/0438* (2013.01); *C02F 1/26* (2013.01); *C02F 1/001* (2013.01); *C02F 1/54* (2013.01)

(58) Field of Classification Search
CPC ............. B01D 11/043; B01D 11/0434; B01D 1/0438; C02F 1/26; C02F 1/54; C02F 1/001
See application file for complete search history.

(56) References Cited

U.S. PATENT DOCUMENTS 3,822,999 A    7/1974   Pope
4,126,551 A    11/1978  Cognevich
(Continued)

FOREIGN PATENT DOCUMENTS

DE   29 13 331 A1   10/1979
JP   09-085120      3/1997
JP   2008-289975    12/2008

OTHER PUBLICATIONS

Taylor, "Review of mixer-settler types and other possible contactors for copper sx." Presented at Alta Conference, Copper 2007. Available at <www.altamet.com/au/tech_papers.htm>, accessed Sep. 19, 2012.*

(Continued)

*Primary Examiner* — Katherine Zalasky
(74) *Attorney, Agent, or Firm* — Crowell & Moring LLP

(57) ABSTRACT

The particle components may be collected by using a phenomenon that the particle components in the aqueous phase aggregate at the liquid-to-liquid interface. Both of the particle components and the dissolved components in the aqueous phase may be simultaneously collected if combined with liquid-liquid extraction phenomenon that the dissolved components in the aqueous phase are collected into the solvent phase through the liquid-to-liquid interface. The aggregation phenomenon of the particle components at the liquid-to-liquid interface may be promoted by using an emulsion flow method, a method of applying mechanical external forces (such as stirring and vibrating) or another method combining both the above-mentioned methods.

3 Claims, 8 Drawing Sheets

(51) Int. Cl.
*C02F 1/00* (2006.01)
*C02F 1/54* (2006.01)

(56) References Cited

U.S. PATENT DOCUMENTS 5,132,016 A * 7/1992 Voit ............................ 210/639
5,334,317 A * 8/1994 Bannach Sichtermann et al.
6,180,394 B1 1/2001 Bisschops
6,500,232 B2 12/2002 Dorlac
2003/0217953 A1 11/2003 Xu
2004/0156911 A1 * 8/2004 Chattopadhyay et al.

OTHER PUBLICATIONS

European Search Report of Appln. 09252285.3 dated May 20, 2010 in English.

* cited by examiner

Suspended Aqueous Solution Alone

Isooctane Added

Standing still after shaking

FIG. 3A
FIG. 3B
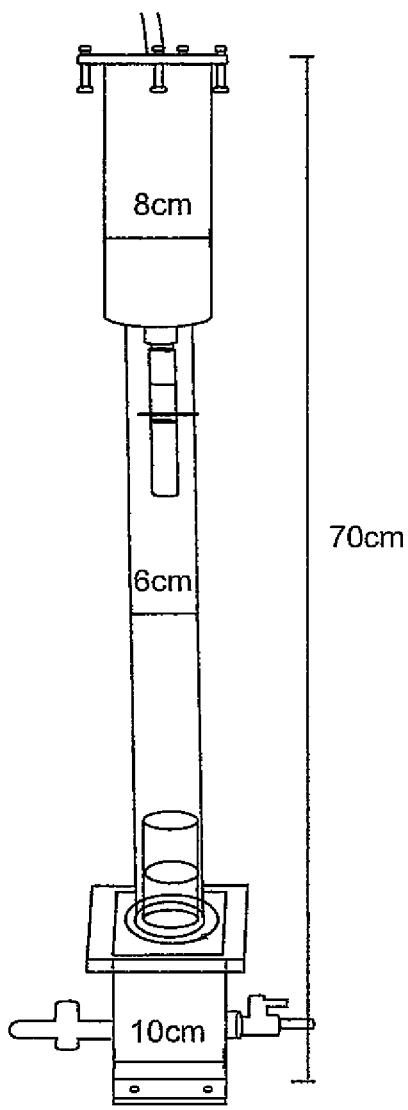
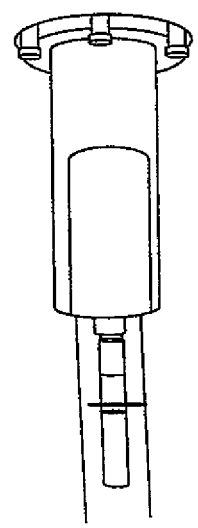

CONTINUOUS COLLECTION METHOD OF PARTICLE COMPONENT IN AQUEOUS SOLUTION AND APPARATUS THEREFOR

CROSS-REFERENCE TO RELATED APPLICATION

This application is a divisional application of U.S. application Ser. No. 12/570,470, filed Sep. 30, 2009, the contents of which are incorporated herein by reference.

BACKGROUND OF THE INVENTION

The present invention relates to a method for collecting continuously particle component in the aqueous solution without using filters and/or centrifuge separators. The method utilizes a phenomenon that particle component in the aqueous solution aggregates at the liquid-to-liquid interface between the aqueous solution (aqueous phase) containing the particle component as the target component and the solvent (solvent phase) having hydrophobic nature and not mixing with water.

Liquid-liquid extraction method (solvent extraction method), by which the target component included in the aqueous solution may be extracted into the solvent (such as organic solvent) that contains extraction agents (extractants) having hydrophobic nature and does not mix with water, is widely used in various industrial fields such as metal refinement, nuclear fuel reprocessing, removal of harmful ingredients in the waste water, recycling by separation and recovering of commercially valuable materials. As for the method for extracting the component in the aqueous solution other than liquid-liquid extraction method, there is another method designed "liquid-to-solid extraction method" which uses solid materials such as resin to be filled into the column and the like structure. Liquid-liquid extraction method, which is often regarded as not so simple as the column-type liquid-to-solid extraction method, is better than the liquid-solid extraction method in terms of extraction capacity and speed of extraction process. In order to extract efficiently the target component in the aqueous solution by applying liquid-liquid extraction, it is required to increase the dimension of the liquid-to-liquid interface by mixing fully the aqueous phase and the extracting solvent phase and thus to promote the interface reaction. In order to meet this requirement, typically, the material transport from one liquid to the other liquid is made reach an equilibrium state by keeping the emulsion state (the state in which the water and the organic solvent are well mixed and formed in emulsion) with continuous stirring and vibration (shaking) operations.

As for the apparatus for extracting the target component included in the aqueous phase into the extracting solvent phase by introducing continuously the aqueous phase and the extracting solvent phase at a constant flow rate, mixer-settler extractors using stirring machines come into wide use. Alternatively, relatively newly developed continuous liquid-liquid extraction apparatus such pulsed column using vibration due to pulse generation in order to disperse liquid drops, and centrifugal extractor for phase separation by using centrifugal forces (refer to JP 09-085120 A) are used in nuclear industries. Specifically, centrifugal extractors are expected to be applied to the reprocessing technology of spent nuclear fuels because they are excellent in the efficiency of the phase contact and the phase separation of the two liquid phases, and are compact in size.

BRIEF SUMMARY OF THE INVENTION

The above mentioned apparatuses, however, have the common principle for mixing two liquid phases by applying mechanical external forces (such as stirring and vibrating) continuously or intermittently, which may lead to such disadvantageous aspects as being not easy to handle, increased running cost, increased maintenance cost, increased apparatus manufacturing cost (initial cost), uncertain safety features. More specifically, they include: 1) large energy load required to generate mechanical external forces; 2) load and stress at the driving parts for generating mechanical external forces; 3) long adjusting work required to prepare and setup the operation of apparatus; 4) risk of ignition due to friction or static electricity at the driving parts; 5) high strength and high price materials required to manufacture the driving parts; 6) ambient noises in connection with stirring, vibrating and high-speed rotating operations; and 7) uncertainty in ensuring safety during earthquake.

On the other hand, emulsion flow technology developed recently can establish the emulsion state of two liquid mixtures only by liquid supply, and hence, does not require external forces differently from conventional liquid-liquid apparatus (JP 2008-289975 A). Thus, all the above-mentioned disadvantageous features associated with the conventional apparatus can be resolved. Emersion flow technology is such an innovative method that enables liquid-liquid extraction (solvent extraction) in a simplified manner similar to column-type liquid-to-solid extraction method which uses solid materials such as resin to be filled into the column. In other words, the extraction apparatus using emulsion flow has also advantageous features in the column-type liquid-solid extraction apparatus (being easy to handle and low running cost) in addition to the advantageous features in the conventional solvent extraction apparatus, such as mixer-settler extractor (large extraction volume and rapid extraction process). As large extraction capacity and rapid extraction process cannot be realized by the column-type liquid-solid extraction apparatus, and easiness to handle and low running cost cannot be realized by the conventional solvent extraction apparatus, it is very significant to enable to establish the co-existence of those advantageous features.

Although emulsion flow technology is an innovative method as described above, it has some unresolved problems. At first, in the conventional single current method, it is difficult to generate fine-grained and high quality emulsion flow, and it is not easy to obtain the extraction rate (extractability) over 90% because some amount of non-uniformity occurs. In addition, in the single current method, as it is difficult to maintain stable emulsion flow in the wide region, there is a problem in scale-up of the apparatus. The holes at the head part from which the aqueous solution is spouted out are often plugged due to the particle component, which is a critical weak point. This plugging problem has been a major challenge in the improvement of the emulation flow because the particle component may typically coexist as suspension materials in the aqueous solution. Note that in the single current method only the aqueous solution is sent by pump and fine-grained at the head part and then spouted into the extracting solvent, leaving the extracting solvent in the apparatus body without being circulated by pump.

An object of the present invention is to provide a method for collecting particle component in the aqueous solution without using filters and/or centrifuge separators. The method utilizes a phenomenon that particle component in the aqueous solution aggregates at the liquid-to-liquid interface.

Another object of the present invention is to provide a method for collecting the particle component suspended in the aqueous solution as well as for extracting and collecting the dissolved component (for example, metallic ions) by solvent (liquid-liquid extraction).

A further object of the present invention is to provide a counter-current type emulsion flow continuous liquid-liquid extraction apparatus allowing to: 1) obtain the extraction rate (extractability) over 90% by generating high quality emulsion flow; 2) facilitate scale-up of the apparatus by maintaining stable emulsion flow in the wide region; 3) prevent the particle component in the aqueous solution from plugging holes in the head part.

One aspect of the continuous collection method for the particle component in the aqueous solution according to the present invention is to collect continuously the particle component in the aqueous solution without using filters but with utilizing a phenomenon that the particle component aggregates at the liquid-to-liquid interface between the aqueous solution (aqueous phase) containing the target suspended particle component and the solvent (solvent phase) having hydrophobic nature and not mixing with water. In this case, it is preferable to establish the emulsion state by mixing the aqueous phase and the solvent phase in order to promote the aggregation of the particle component at the liquid-to-liquid interface.

Another aspect of the continuous collection method for the particle component in the aqueous solution according to the present invention is to collect both the particle component and the dissolved component in the aqueous phase at the same time by using both an aggregation phenomenon that the particle component in the aqueous phase aggregates at the liquid-to-liquid interface and a liquid-liquid extraction phenomenon that the dissolved component in the aqueous phase is extracted into the solvent phase through the liquid-to-liquid interface. In case of collecting dissolved metal ions simultaneously combined with liquid-liquid extraction, an organic ligand designated as an "extraction agent (extractant)" may be added to the solvent.

One aspect of the counter-current type emulsion flow continuous liquid-liquid extraction apparatus comprises the first head part for spouting the aqueous phase, the second head part for spouting the extracting solvent phase, said the second head part arranged in the opposite position to the first head part, the column part where the emulsion flow generates, the upper phase separation part installed at the upper side of the column part and the lower phase separation part installed at the lower side of the column part, and further comprises the fluid supply pump.

By adopting the counter-current method, emulsion flow can be more stabilized and more fine-grained in comparison with the apparatus based on the single current method. In addition, in the counter-current method in which the extracting solvent phase is fine-grained and circulated, the apparatus can be operated stably without any effect by the particle component. This is realized by using such a characteristic that the particle component in the aqueous solution is never distributed into the extracting solvent. Thus, upon making the extracting solvent phase fine-grained, there is no need for paying attention to the plugging problem in the head part (the second head part). In the emulsion flow based on the counter-current method, it is proved that the structure of the second head part influences the quality of emulsion flow, and that the structure of the first head part spouting the aqueous phase is not dominant. This means that, even if the first head part may not have a structure in which the particle component cannot pass sufficiently through the head part (the structure in which the aqueous phase may not be fine-grained), there is no significant effect on the extractability. The invention of the emulsion flow has been completed according to those new findings.

It will be appreciated that the apparatus according to the present invention, in comparison with the conventional apparatus based on the continuous centrifugal separation method, may provide larger processing capacity and reduced levels of running cost, initial cost and maintenance cost as well as the size of the apparatus itself is compact. Thus, the apparatus according to the present invention is expected to be used in plants in various industrial fields. In addition, it will be appreciated that the method according to the present invention may provide such a significant effect not found in the conventional methods that the dissolved component as well as the particle component can be simultaneously collected, as necessary, being combined with the liquid-liquid extraction method.

Moreover, it will be appreciated that high quality and stable characteristic in the emulsion can be attained; the target component can be extracted with higher extractability, and also that the scale-up of the apparatus can be facilitated, all of which cannot be attained by the emulsion flow apparatus based on the single current method. In addition, by adopting the counter-current method, the plugging problem in the head part due to the particle component such as suspension materials, which is recognized as the critical weak point of the emulsion flow apparatus based on the single current method, is solved.

BRIEF DESCRIPTION OF THE SEVERAL VIEWS OF THE DRAWINGS

FIG. 3A is an overall configuration showing a small-sized experimental setup for the emulsion flow apparatus shown in FIG. 2, and FIG. 3B is an enlarged view of a part of the apparatus.

DETAILED DESCRIPTION OF THE PREFERRED EMBODIMENTS

Now, referring to the attached figures, a continuous collection method of a particle component in an aqueous solution will be described in detail. At first, refer to FIG. 1 and FIG. 2. FIG. 1 illustrates an example of the phenomenon that the particle component aggregates at the liquid-to-liquid interface to be interpreted as the basic principle of the present invention. FIG. 2 illustrates an example of the embodiment apparatus for implementing the continuous collection method of the particle component in the aqueous solution according to the present invention.

Figure 1A:
FIG. 1A, FIG. 1B and FIG. 1C are illustrations representing the phenomenon that aluminum oxide $Al_2O_3$ particles aggregate at the liquid-to-liquid interface.
Figure 1B:
Figure 1C:

Refer to FIG. 1A, FIG. 1B and FIG. 1C. Suspended aqueous solution including large amount of iron oxide $Fe_2O_3$ was prepared as the particle component in the test tube (refer to FIG. 1A), and then isooctane was added gently into the test tube (refer to FIG. 1B), and then the test tube was shaken by hand for ten seconds, and then the test tube was allowed to stand for 1 minute (refer to FIG. 1C). In the consequence of those operations, iron oxide $Fe_2O_3$ aggregated at the liquid-to-liquid interface and the suspended aqueous solution was purified. In this step, the aggregation of the particle component at the liquid-to-liquid interface may be promoted by generating the emulsion state by mixing the aqueous phase and the solvent phase.

Figure 2A:
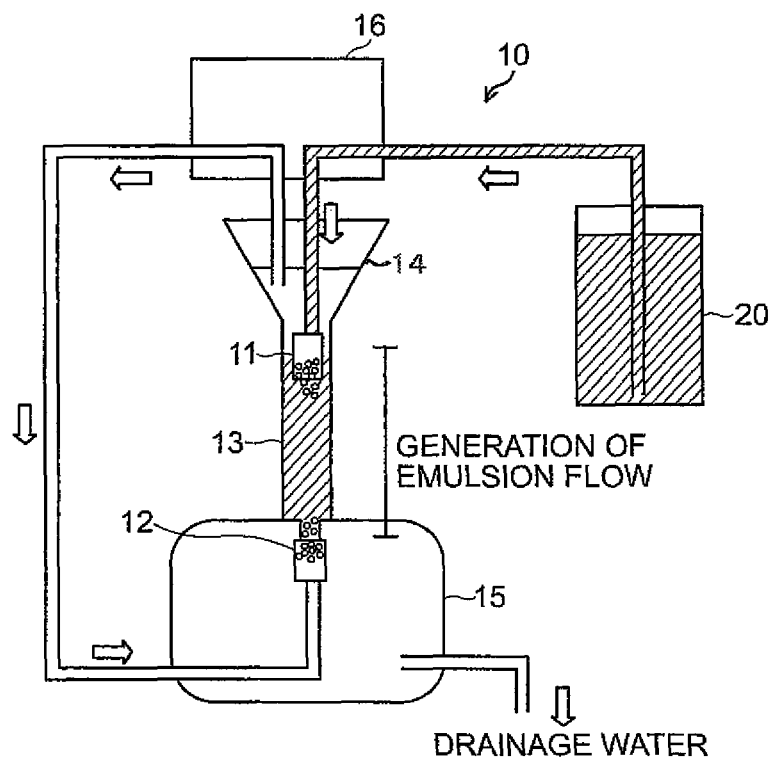
FIG. 2A and FIG. 2B are schematic diagrams illustrating an example of the emulsion flow apparatus implementing the continuous collection method for the particle component in the solution according to the present invention.
Figure 2B:
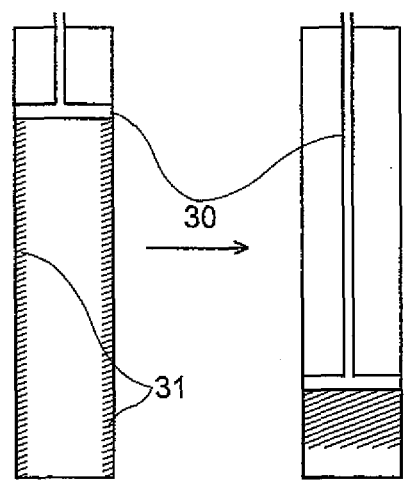

Next, referring to FIG. 2A and FIG. 2B, the continuous collection method for the particle component in the aqueous solution according to the present invention will be described specifically. The emulsion flow apparatus 10 illustrated in FIG. 2A is composed of the apparatus body, being composed of the first head part 11 for spouting the aqueous phase, the second head part 12 for spouting the solvent phase, the column part 13 in which emulsion flow is formed, and the phase separation parts placed at the upper and lower sides of the column part (upper phase separation part 14 and lower phase separation part 15), and the liquid supply pump 16 (a single duplex pump or a couple of simple pumps). Note that the head parts are not necessarily required to contact the liquid phase (aqueous phase, solvent phase or emulsion mixed phase). The water sample in the reservoir 20 is supplied through the conduit tube 21 to the emulsion flow apparatus 10. The first head part 11 has either one of the following structures;

a hollow cylinder with its both ends being open, a hollow cylinder with its one end being covered by a sheet having mesh or holes with pitch or diameter from 1 μm to 5 mm, a hollow cylinder with its one end being closed and with the adequate number of holes with diameter from 1 μm to 5 mm being formed at the side face of the hollow cylinder, or being formed at the closed bottom face of the hollow cylinder or being formed at both of the side face and the closed bottom face of the hollow cylinder, a hollow cylinder with holes being formed at its side face covered with a sheet having mesh or holes with pitch or diameter from 10 μm to 1 mm, and a hollow cylinder with a porous material (i.e., sintered glass plate) whose pore diameter is from 10 μm to 1 mm bonded onto one end of the cylinder.

Note that the second head part has a structure similar to the structure of the first head part, although the size of mesh or holes formed at the second head part may be different from the size of mesh or holes formed at the first head part. At the upper phase separation part 14 and the lower phase separation part 15, phase separation is caused by a flow rate decrease and turbulence in an emulsion flow due to a rapid increase in the volume of a part through which the emulsion flow passes, in which those parts are not necessarily required to be built in the apparatus body as a vessel having a diameter larger than the diameter of the column part 13, and it is allowed to make this vessel structured as a vessel having a volume smaller than the volume of the column part 13 and having a narrow mouth.

Now, the operation of the apparatus in FIG. 2A will be described below. By means of the liquid supply pump 16 placed at the conduit tube 21 connecting the emulsion flow apparatus 10 to the reservoir 20 for the water sample containing the particle component and, the aqueous solution supplied from the reservoir 20 is made spouted into the organic solvent through the tube provided as the first head part 11 of the emulsion flow apparatus 10. At the same time, the liquid droplets so formed by fine-graining the solvent phase are made spouted through the pipe provided as the second head part 12 of the apparatus from the opposite direction to the flow direction of the aqueous solution. Owing to those operations, a flow composed of the aqueous phase and the solvent phase formed as emulsion mixed phase (referred to as "emulsion flow") is generated. When the emulsion mixed phase reaches the phase separation parts 14 and 15 of the emulsion flow apparatus 10, the state of emulsion disappears and then the aqueous phase and the solvent phase are separated from each other. The solvent phase is localized at the upper phase separation part 14, and the aqueous phase is localized at the lower phase separation part 15. The clean solvent phase in the upper phase separation part 14 is circulated through the second head part 12. The clean aqueous phase in the lower phase separation part 15 is drained as drainage water after processing. It should be noted that the head parts 11 and 12 may not be necessarily shaped in a circular cylinder, but may be shaped in a square cylinder. The column part 13 and the phase separation parts 14 and 15 may not be necessarily shaped in a circular columned form, but may be shaped, for example, in a square columned form.

The particle component 31 in the aqueous solution (refer to FIG. 2B) will be deposited on the inner wall of the column part 13 in connection to the emulsion flow generation at the column part 13. This is because the particle component aggregated at the liquid-to-liquid interface with its area increased due to the generation of the emulsion state does not transfer into the aqueous phase and the solvent phase but stays inside the emulsion flow formed as the emulsion mixed phase, and thus, the particle component is deposited on the inner wall after repeating the circulating movements inside the emulsion flow. The particle component 31 deposited on the inner wall of the column part can be collected, for example, by using a piston 30 as shown in FIG. 2B.

Some specific embodiments will be described below. The small-sized and intermediate-sized emulsion flow apparatuses (both having the height of 70 cm) as shown in FIG. 3 and FIG. 4, respectively, were fabricated, and the experiments were carried out for collecting only a particle component and for collecting simultaneously both a particle component and a dissolved component, and then the performance of the apparatus was evaluated. The experimental results were compared with those in the conventional method (continuous centrifugal separation method). Aluminum oxide $Al_2O_3$ particles classified in the range from 20 μm to 25 μm in particle diameter are used as the particle component and ytterbium Yb (trivalent ion) was used as the dissolved component. Note that the present invention is not limited to those specific embodiments.

In the following embodiments, the aluminum oxide $Al_2O_3$ particles provided with a uniform diameter by classification were used, and the ratio of the weight of collected particles to the weight of initially added particles (collection ratio) was estimated by collecting the residual particles in the aqueous solution after processing and measuring their weight. The following shows the classification method for the particles and the estimation method for the collection ratio.

<Classification Method for Aluminum Oxide $Al_2O_3$ Particles>

In the following steps, aluminum oxide $Al_2O_3$ particles were classified.

1) Aluminum oxide $Al_2O_3$ particles were dried in a desiccator containing phosphorus pentaoxide over night.
2) The particles were classified by using two stainless steel sieves (with 20 μm and 25 μm meshes, respectively).
   At first, using a 25 μm sieve, particles with 25 μm or larger diameter were removed (that is, particles passing through the sieve were collected).
   Next, using a 20 μm sieve, particles with 20 μm or smaller diameter were removed (that is, particles remaining on the 20 μm sieve were collected).
Thus, aluminum oxide $Al_2O_3$ particles with diameter between 20 μm and 25 μm were classified.

<Estimation Method for Collection Ratio of Aluminum Oxide $Al_2O_3$ Particles>

Aluminum oxide $Al_2O_3$ particles that were not collected by the apparatus but remained in the aqueous solution were measured by filter method. Polycarbonate filter (with 0.2 μm mesh), which does not change in weight even in contacting to water, was used.
1) The empty weight of the filter was measured.
2) Aluminum oxide $Al_2O_3$ particles included in the aqueous phase of 2 to 3 litters were separated by the filter.
3) The filter was dried in the desiccator containing silica gel for about one day.
4) The weight of the dried filter was measured, and the weight of residual aluminum oxide $Al_2O_3$ particles was estimated to be the difference between the resultant measured weight and the empty weight. Assuming that the concentration of aluminum oxide $Al_2O_3$ in the initial solution before processing is a (mg/L) and the concentration of residual aluminum oxide $Al_2O_3$ is b (mg/L), the collection ratio is calculated as $(a-b)/a \times 100(\%)$.

Embodiment 1

Experiment for Collecting Particle Component in Aqueous Solution by Small-Sized Apparatus Refer to FIG. 3A and FIG. 3B. Using a small-sized emulsion flow apparatus 10a (with the apparatus volume=3 litters and the apparatus weight=2 kg), an experiment for collecting aluminum oxide $Al_2O_3$ particles was carried out. More specifically, 20 litters of aqueous nitric acid solution (pH 2) including aluminum oxide $Al_2O_3$ particles (with particle diameter between 20 μm and 25 μm) by 0.02 M were prepared and an experiment for collecting the particle component was carried out by using a small-sized emulsion flow apparatus provided with 1 litter of isooctane. FIG. 3A shows a photo picture of the small-sized emulsion flow apparatus used in the experiment. The first head part 11 used in the apparatus has such a structure that the side wall of the hollow cylinder with its one end being closed, being made of polypropylene, and being provided with 10 holes having 1 mm diameter. The second head part 12 has such a structure that a sintered glass plate having pores with 40 μm diameter bonded onto the end of the hollow cylinder as described above. In order to avoid emulsion mixed phase and supply clean organic solvent phase, the upper phase separation part 14 has such a structure that a vessel having a narrow mouth inserted at the upper side of the column part 13 (refer to FIG. 3B)). The lower phase separation part 15 connected to the lower part of the column part 13 has such a structure that a vessel with a diameter larger than the diameter of the column part 13.

Under the conditions that the flow rate of the aqueous phase to be supplied was set to be 20 litters per hour and the flow rate of the solvent phase to be circulated was set to be 20 litters per hour in order to process 20 litters of aqueous nitric acid solution including aluminum oxide $Al_2O_3$ particles as the particle component using the above described small-sized emulsion flow apparatus, the overall processing time was 60 minutes (with processing capacity of 20 litters per hour) to collect almost 100% (99.5% or higher: note that the digits after the decimal point were not reliable due to the measurement error) of aluminum oxide $Al_2O_3$ particles.

Embodiment 2

Figure 4A:
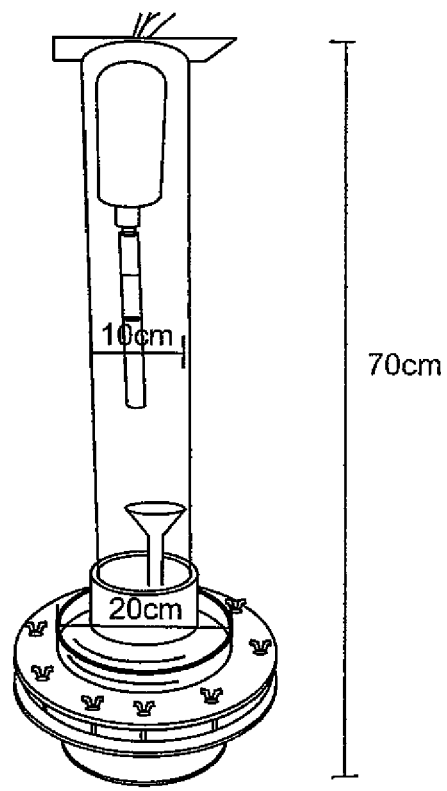
FIG. 4A is an overall configuration showing an intermediate-sized experimental setup for the emulsion flow apparatus shown in FIG. 2.

Experiment for Collecting Particle Component in Aqueous Solution by Intermediate-Sized Apparatus Refer to FIG. 4A. FIG. 4A shows an intermediate-sized emulsion flow apparatus. The term of "Intermediate-sized" apparatus means an apparatus having an apparatus volume three times larger than the apparatus volume used in Embodiment 1. In this experiment, the intermediate-sized emulsion flow apparatus shown in FIG. 4A (with the apparatus volume=9 litters and the apparatus weight=4 kg) was used. The first head part 11 used in the apparatus has such a structure that the side wall of the hollow cylinder with its one end being closed, being made of polypropylene, and being provided with 6 holes having 4.8 mm diameter. The second head part 12 has such a structure that a sintered glass plate having pores with 40 μm diameter bonded onto the end of the hollow cylinder as described above. In order to avoid emulsion mixed phase and supply clean solvent phase, the upper phase separation part 14 has such a structure that a vessel having a narrow mouth inserted at the upper side of the column part 13 (refer to FIG. 4B). The lower phase separation part 15 connected to the lower part of the column part 13 has such a structure that a vessel with a diameter larger than the diameter of the column part 13. It should be noted that this apparatus has a processing capacity about 10 times larger than the processing capacity of the apparatus used in Embodiment 1.

200 litters of aqueous nitric acid solution (pH 2) including aluminum oxide $Al_2O_3$ particles (with particle diameter between 20 μm and 25 μm) by 0.02 M were prepared, and then an experiment for collecting the particle component was carried out by using a small-sized emulsion flow apparatus provided with 2 litters of isooctane. Under the conditions that the flow rate of the aqueous phase to be supplied was set to be 228 litters per hour and the flow rate of the solvent phase to be circulated was set to be 30 litters per hour, the overall processing time for 200 litters of the aqueous solution was 53 minutes (with processing capacity of 228 litters per hour). In the experimental result, almost 100% of aluminum oxide $Al_2O_3$ particles could be collected similarly to Embodiment 1. It is proved that the increased processing capacity for the aqueous solution from 20 litters per hour (in Embodiment 1) to 228 litters per hour (in Embodiment 2) gives little effect to the collection ratio of aluminum oxide $Al_2O_3$ particles. From the experimental findings as described above, it is proved that the emulsion flow apparatus can be scaled-up while its processing capacity is maintained.

It is also proved that the size of holes formed at the head part from which the aqueous phase is spouted out (the first head part 11) is not dominant. That is, it is proved that larger sized holes formed at the first head part 11 could be applicable for processing the aqueous solution including the particle component having a larger size without plugging in the holes. It should also be noted that there is no concern of plugging problem at the second head part 12 because the particle component in the aqueous phase is not transported into the solvent phase.

Comparison Example 1

Comparison with Continuous Centrifugal Separation Method

Using a commercial apparatus (H-660-type Continuous Centrifuge Separator, manufactured by KOKUSAN Co. Ltd. in Japan), an experiment was carried out for collecting aluminum oxide $Al_2O_3$ particles classified, which were the same as those used in Embodiment 1, from the aqueous solution. Under the conditions that the number of rotations of the rotor was 15,000 rpm and the suspended aqueous solution was processed at 23 litters per hour, almost 100% (99.5% or higher: note that the digits after the decimal point were not reliable due to the measurement error) of aluminum oxide $Al_2O_3$ particles could be collected. The dimensions of H-660-type Continuous Centrifuge Separator are 650 mm in width, 650 mm in depth and 870 mm in height, its apparatus volume is 368 litters and its apparatus weight is 160 kg.

Embodiment 3

Experiment for Collecting Simultaneously Particle Component and Dissolved Component in Aqueous Solution Dissolved metallic ion and suspended particle component can be selectively and simultaneously collected by adding an extraction agent relevant to the metal ion to such a solvent phase as isooctane; while, in Embodiment 1 and Embodiment 2, pure isooctane is used. In Embodiment 3, an experiment was carried out by using the above described intermediate-sized emulsion flow apparatus provided with 2 litters of isooctane including bis(2-ethylhexyl)phosphoric acid (DEHPA) as the extraction agent by $1\times10^{-3}$ M and with 200 litters of aqueous nitric acid solution (pH 2) including aluminum oxide $Al_2O_3$ particles as the particle component by 0.02 M and ytterbium Yb (trivalent ion) as the dissolved component by $6\times10^{-6}$ M. As the experimental result, almost 100% of aluminum oxide $Al_2O_3$ particles as the particle component and about 98% of ytterbium Yb as the dissolved component could be separately collected, respectively. The intermediate-sized apparatus shown in FIG. 4 (a) was also used in this experiment, and under the condition that the flow rate of the aqueous phase to be supplied was set to be 231 litters per hour and the flow rate of the solvent phase to be circulated was set to be 30 litters per hour, the overall processing time for 200 litters of the aqueous solution was 52 minutes (with processing capacity of 231 litters per hour). FIG. 5 shows a photo picture of large amount of aluminum oxide $Al_2O_3$ particles deposited at the column part after completing the collecting operation in this embodiment.

The particle collection performance, defined in terms of the collection ratio, of the emulsion flow apparatus of the present invention is little different from that of the continuous centrifuge separator. As the emulsion flow apparatus does not have a power output section that requires a number of heavy metallic parts, this apparatus is light and has no limitation in handling solutions containing acids. In addition, since such a solvent as alkane (for example, kerosene) having hydrophobic nature and not mixing with water is used in the method of the present invention, a component dissolved in an aqueous solution can also be simultaneously collected and removed by liquid-liquid extraction. In case of collecting the dissolved component together with a particle component, the extraction agent may be added to an alkane as the solvent, in which this method can be fit to provide low environmental impact by using an extraction agent that has low solubility in water and has a tendency to be decomposed easily in environment.

Embodiment 4

Figure 4B:
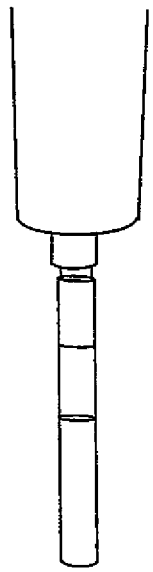
FIG. 4B is an enlarged view of a part of the apparatus.
Figure 5:
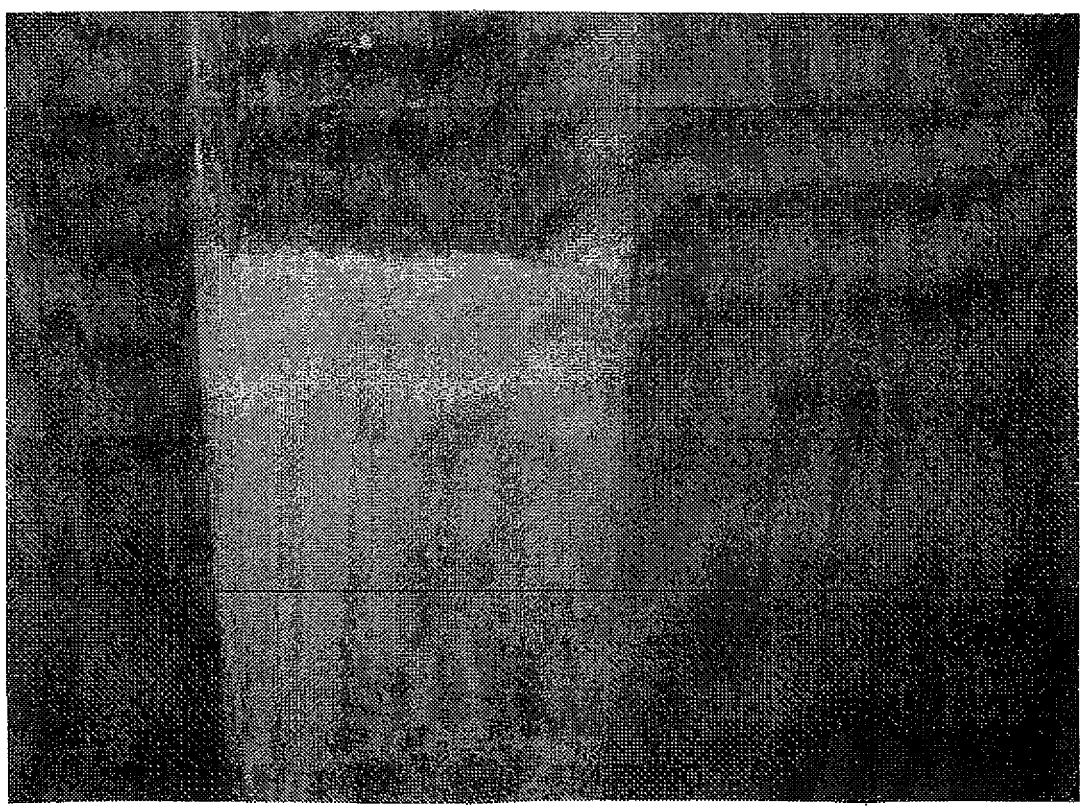
FIG. 5 is a photo picture showing the state of aluminum oxide $Al_2O_3$ particles deposited at the column part in the experimental setup for the emulsion flow apparatus shown in FIG. 2.

Continuous Extraction of Ytterbium Yb (III) from Aqueous Nitric Acid Solution A continuous extraction experiment for ytterbium Yb (III) from aqueous nitric acid solution was carried out by using a counter-current type emulsion flow extraction apparatus 10, having the height of 70 cm, as shown in FIG. 4A and FIG. 4B. Here, the first head part 11 has such a structure that the side wall of the hollow cylinder with its one end being closed, being made of polypropylene and having 1.5 cm diameter and 5 cm in height, is provided with 38 holes (2 mm in diameter), and that Teflon™ sheet having mesh with 70 µm pitch covers over the side wall of the hollow cylinder. The second head part has such a structure that a sintered glass plate having holes with 40 µm diameter is bonded onto one end of the hollow cylinder as described above. The upper phase separation part 14 has such a structure that a vessel with a narrow mouth is inserted at the upper side of the column part 13. The lower phase separation part 15 has such a structure that a vessel having a diameter larger than the diameter of the column part 13 is coupled to the lower side of the column part 13.

The relation between the extraction rate (extractability) of ytterbium Yb (III) and the liquid supply volume was measured: ytterbium Yb (III) and bis(2-ethylhexyl)phosphoric acid (DEHPA) are employed as a metal ion and an extraction agent (extractant), respectively. The volume of the sample aqueous solution (aqueous phase) was 200 litters, the volume of the organic phase, in which isooctane was used as the solvent, was 2 litters. Hydrogen ion exponent, pH, of the aqueous phase was adjusted to be 2.0 by adding nitric acid, and the concentration of ytterbium Yb (III) in the aqueous phase was set to be $6\times10^{-6}$ M. The concentration of the extraction agent (DEHPA) in the organic phase was set to be $6\times10^{-2}$ M.

Figure 6:
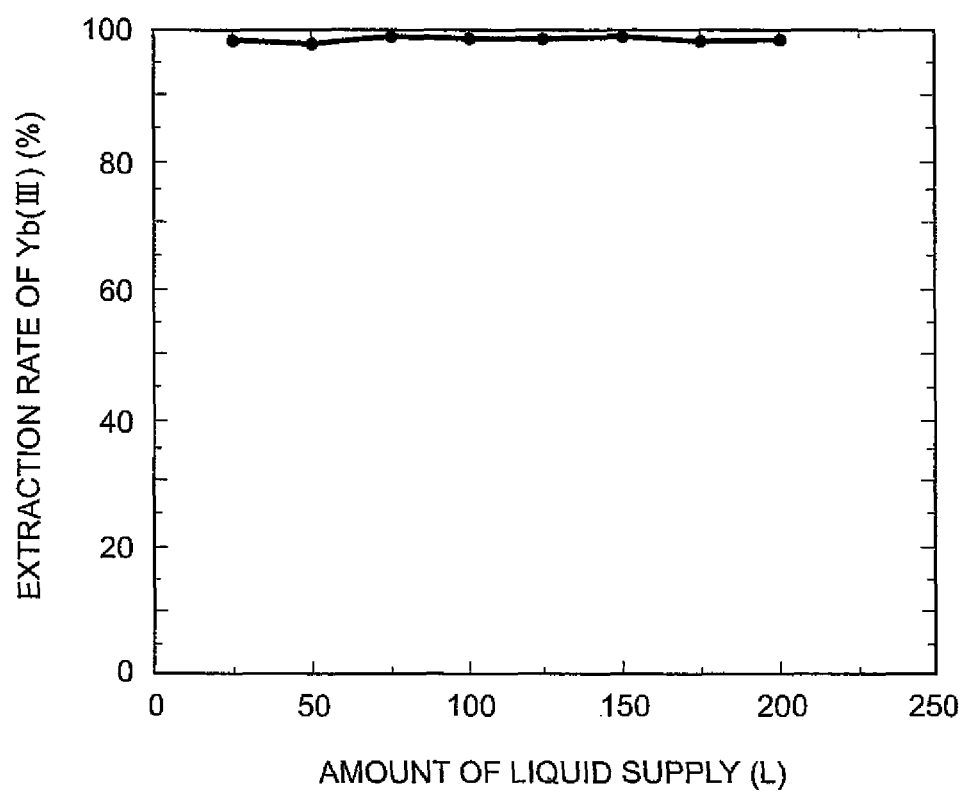
FIG. 6 is a graph showing the result of continuous extraction of ytterbium Yb (III) from the aqueous nitric acid solution.

An experiment was carried out under the condition that the flow rate in the liquid supply of the aqueous phase is 184 litters/hour and the flow rate in circulating the organic phase is 30 litters/hour (i.e. processing performance=184 litters/hour). The aqueous phase was sampled every 25 litters processed as drainage water, and then the concentration of ytterbium Yb (III) was measured by the inductively coupled plasma mass spectrometry apparatus (ICP-MS). FIG. 6 shows the result of the measurements. The extraction rate of ytterbium Yb (III) was about 99%, which was independent of the supply liquid volume.

Embodiment 5

Continuous Extraction of Ytterbium Yb (III) in the Coexistence of Particle Component Using the same counter-current type emulsion flow extraction apparatus as used in Embodiment 2, an experiment for continuous extraction of ytterbium Yb (III) in the coexistence of particle component was carried out. Namely, the first head part 11 used in this experiment has such a structure that the hollow cylinder with its one end being closed, being made of polypropylene and having 1.5 cm diameter and 5 cm in height, is provided with only 6 holes having 4.8 mm diameter on the side wall of the cylinder (and without a mesh sheet). The second head part 12 has the similar structure as Embodiment 1 in which a sintered glass plate having holes with 40 μm pore diameter is bonded onto the side wall of the hollow cylinder as described above.

An experiment was carried out by using the above described counter-current type emulsion flow extraction apparatus for extracting ytterbium Yb (III) from the aqueous solution containing aqueous nitric acid solution (pH=2.0) including ytterbium Yb (III) by $6 \times 10^{-6}$ M coexisting with aluminum oxide $Al_2O_3$ fine particles (having a particle diameter of 40 μm or smaller) into isooctane containing DEHPA by $1 \times 10^{-2}$ M. The volume of the sample aqueous solution (aqueous phase) was set to be 200 litters, and the volume of the organic phase was set to be 2 litters. Conditions other than the coexistence of aluminum oxide $Al_2O_3$ fine particles were the same as the conditions of Embodiment 4. The amount of coexisting aluminum oxide $Al_2O_3$ fine particles was 0.02 M in terms of molar concentration.

Figure 7:
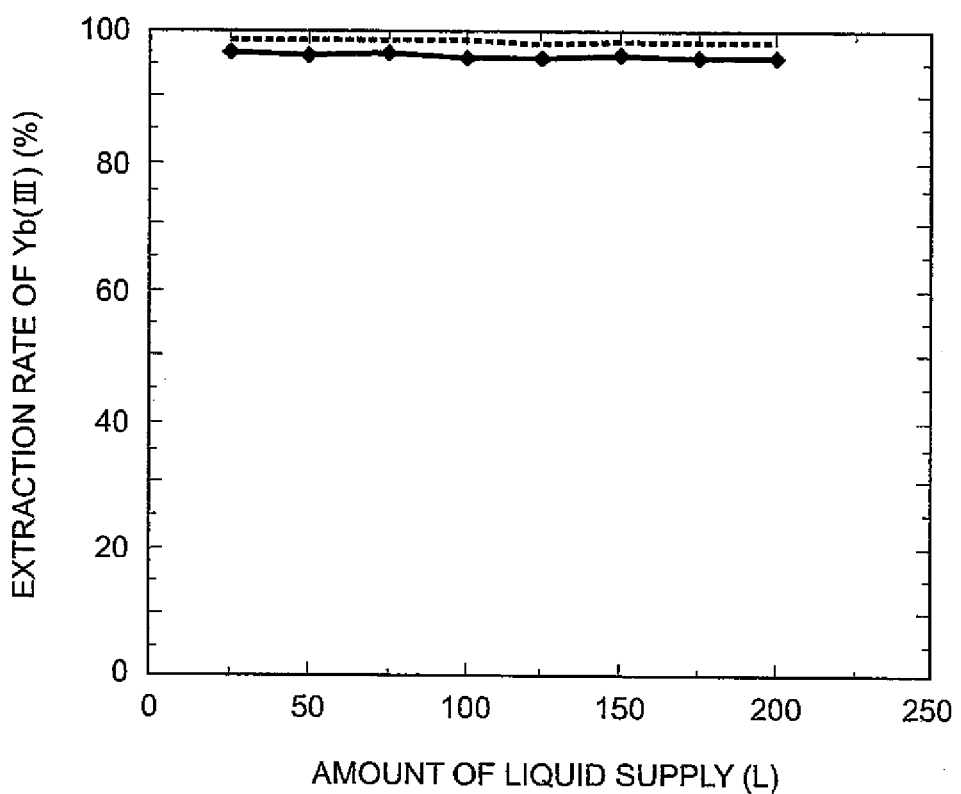
FIG. 7 is a graph showing the result of continuous extraction of ytterbium Yb (III) in the coexistence of the particle component ($Al_2O_3$).

The experiment was carried out under the condition in which the flow rate in the liquid supply of the aqueous phase is 237 litters/hour and the flow rate in circulating the organic phase is 30 litters/hour (i.e. processing performance=237 litters/hour). The aqueous phase was sampled every 25 litters processed as drainage water, and then the concentration of ytterbium Yb (III) was measured by ICP-MS. FIG. 7 shows the result of the measurement. The extraction rate of ytterbium Yb (III) was about 97%, which was independent of the supply liquid volume. It is proved that a satisfactory level of extraction rate can be achieved although this result may be slightly smaller than the result of Embodiment 1 in which the extraction rate was 99%. There was no plugging at the first head part 11 and the second head part 12, respectively. Note that the broken line in FIG. 7 plots the data from FIG. 6.

According to the above described experiment, it was proved that metal ions can be extracted with no effect by the particle component even from the aqueous solution in which large amount of particle component coexists. In addition, it was found that the structure of the second head part 12 determines the quality of emulsion flow, and that the structure of the first head part 11 is not dominant.

Embodiment 6

Time Required for Restarting Apparatus after Stopping Apparatus

Using the same counter-current type emulsion flow extraction apparatus as used in Embodiment 2 (with the same structures of the first head part 11 and the second head part 12), the time required for restarting the apparatus after stopping the apparatus was measured. After stopping completely the apparatus normally operated, the time from restarting the liquid supply pump to generation of stable emulsion flow was measured.

The liquid supply pump was made stop suddenly in operating the apparatus under the condition that the flow rate in the liquid supply of the aqueous phase is 205 litters/hour and the flow rate in circulating the organic phase is 30 litters/hour. It was found that the state of stable emulsion flow was established after about 5 seconds after restarting the liquid supply pump at 2 minutes passed after stopping suddenly the apparatus. Thus, it was proved that the operation of the apparatus can be restarted promptly without any adjusting work even if liquid supply process completely stops.

Embodiment 7

Extraction of Uranium U from Low-Level Radioactive Waste Liquid

Figure 8:
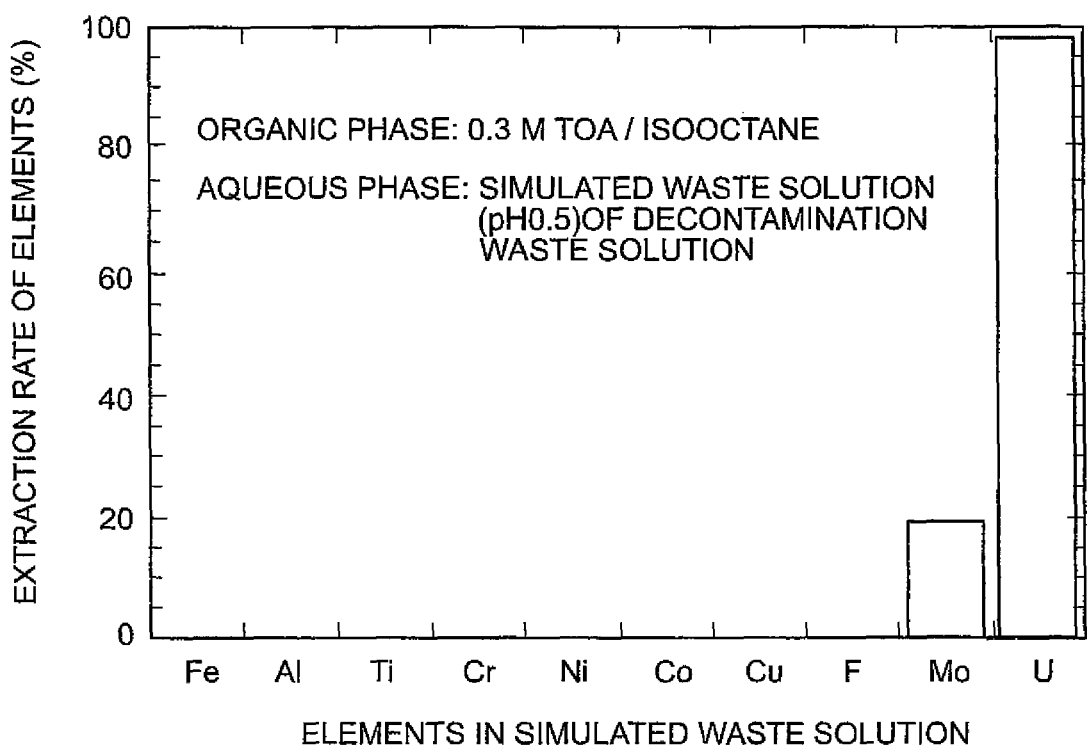
FIG. 8 is a graph showing the result of extracting uranium U from the waste solution simulating the decontamination waste solution in highly selective manner by the counter-current type emulsion flow apparatus.

In order to simulate the decontamination waste solution that may be disposed in connection to dismantlement of the equipment used in the nuclear power facility (i.e. waste solution generated by acid pickling and removing of radioactive materials deposited on the equipment), sulfuric acid aqueous solution (pH=0.5) including Al ($8.4 \times 10^{-4}$ M), Ti($4.6 \times 10^{-4}$ M), Cr ($1.1 \times 10^{-4}$ M), Fe ($4.2 \times 10^{-2}$ M), Co ($4.3 \times 10^{-3}$ M), Ni ($6.1 \times 10^{-3}$ M), Cu ($2.1 \times 10^{-4}$ M), Mo ($3.8 \times 10^{-4}$ M) and U ($5.0 \times 10^{-7}$ M) was prepared, and the selective extraction of Uranium U was attempted by using the same counter-current type emulsion flow extraction apparatus as used in Embodiment 2. Trioctyl amine (TOA) was used as an extraction agent, and isooctane including n-octanol with 2.5 vol % (volume percentage) was used as a solvent. Note that the concentration of TOA was 0.3 M. An experiment was carried out under the condition that the flow rate in the liquid supply of the aqueous phase is 225 litters/hour and the flow rate in circulating the organic phase is 30 litters/hour. From the experimental result, it was proved that only Uranium U of low concentration can be extracted with its extractability of 97% in highly selective manner from the solution including various metal ions coexisting in high concentrations. FIG. 8 shows the experimental result. Note that molybdenum Mo was extracted in some quantity, which may lead to an advantageous result because the removal of molybdenum Mo by precipitation is difficult intrinsically, and molybdenum Mo may be extracted as it happens.

INDUSTRIAL APPLICABILITY

The counter-current type emulsion flow continuous liquid-liquid extraction apparatus according to the present invention has a number of advantageous features in comparison with the conventional continuous liquid-liquid extraction apparatus (such as mixer-settler extractor, pulsed column and centrifugal extractor). For example, from the view point of cost-effectiveness, low running and maintenance costs are important features. Differently from the conventional continuous liquid-liquid extraction apparatus, the emulsion flow apparatus is not required to apply continuously the mechanical external forces (such as stirring and vibrating), the electric power consumption for the operation may be saved. The energy required to be used for driving the liquid supply may be free from electric power by applying the potential energy or the drainage water flow energy. In addition, handiness is one of the significant factors. For example, in the conventional continuous liquid-liquid extraction apparatus, long adjusting work is required when starting up the apparatus and fine control is required even at the normal operation of the apparatus, and furthermore, those adjustment and control require experienced skills. On the other hand, the emulsion flow continuous liquid-liquid extraction apparatus requires short adjusting work and little experienced skill for operating the apparatus because the apparatus is stable against the change in the liquid supply volume and can be operated stably so as to restore the steady state within about 5 seconds even if the apparatus might shut down suddenly. Those features may lead to large reduction in the labor cost. In addition, as the apparatus is compact in its structure, it may be fabricated easily and with low cost, and the initial cost for installation may be low, and furthermore, as the apparatus does not require a large installation space due to its compact size, it may be advantageous to integrate the plant with the apparatus. In addition, the apparatus according to the present invention advantageously provides higher safety features in comparison with the conventional apparatuses. In such an apparatus as based on emulsion flow dynamics, the following characteristics may contribute to higher safety features; insusceptibility of vibration (with high earthquake-resisting capacity)

in the similar way to the column-type liquid-to-solid extractor, the reduced amount of organic solvent because of the compactness of the apparatus itself, and no existence of frictional heat generated due to the repetitive and continuous application of mechanical external forces (such as stirring and vibrating). In addition, the reduced amount of waste solution in associate with adjusting work and the reduced level of ambient noises may provide valuable advantageous features in terms of environmental impact. The above mentioned advantageous features come from the nature of the emulsion flow apparatus without using mechanical external forces, which enables to establish the efficient liquid-liquid extraction in a similar level of handiness to the column-type liquid-solid extraction.

As described above, the counter-current type emulsion flow continuous liquid-liquid extraction apparatus is expected to be widely put to practical use in various industrial fields related to liquid-liquid extraction technologies (such as metal refinement technology and rare metal recycling technology). In addition, owing to a large number of excellent features that are not provided by the conventional liquid-liquid extraction apparatus, a new market development for liquid-liquid extraction may be expected. For example, next-generation continuous liquid-liquid extraction apparatus to be applied in wet reprocessing for spent nuclear fuels, and facilities for purifying the large amount of low-level radioactive liquid waste with lower cost and with high processing performance may be expected due to the nature of the emulsion flow apparatus such as higher safety features, easiness in handling, low cost and compactness of the apparatus itself (refer to Embodiment 4). In addition, although it was difficult in terms of cost, operability and safety features to apply the conventional liquid-liquid extraction methods to the purifying processes for environmental water and the water treatment processes for a large amount of waste water, it may be expected by using the counter-current type emulsion flow continuous liquid-liquid extraction apparatus that efficient water purification processing and waste water processing with high operational performance can be realized.

What is claimed is:

1. A continuous collection method of a particle component in an aqueous solution, comprising the steps of:
   introducing a particle component and a dissolved component in an aqueous phase into a top of a column part;
   spouting a solvent phase having hydrophobic nature and not mixing with water from a bottom of the column part, thereby generating an emulsion flow of the aqueous phase and solvent phase in the column part, wherein the particle component in the aqueous phase aggregates at a liquid-to-liquid interface using an aggregation phenomenon and the dissolved component in the aqueous phase is extracted into the solvent phase through the liquid-to-liquid interface;
   removing the solvent phase in an upper phase separation part coupled to an upper side of the column part;
   removing a clean aqueous phase from which particle component and dissolved component have been removed from a lower phase separation part coupled to a lower side of the column part; and
   collecting the particle component that has aggregated at the liquid-to-liquid interface within the column part.

2. The continuous collection method of a particle component in an aqueous solution according to claim 1, further comprising circulating the solvent phase from the upper phase separation part to the bottom of the column part.

3. The continuous collection method of a particle component in an aqueous solution according to claim 1, wherein the step of collecting the particle component that has aggregated at the liquid-to-liquid interface within the column part comprises depositing the particle component that has aggregated at the liquid-to-liquid interface on an inner wall of the column part, and then collecting the particle component that has been deposited on an inner wall of the column part.

* * * * *